United States Patent
Hartlove et al.

(10) Patent No.: US 7,557,854 B2
(45) Date of Patent: Jul. 7, 2009

(54) AUTO-FOCUS SYSTEM USING BUBBLE TECHNOLOGY

(75) Inventors: Jason T. Hartlove, Los Altos, CA (US); Guolin Ma, Milpitas, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 751 days.

(21) Appl. No.: 10/981,272

(22) Filed: Nov. 3, 2004

(65) Prior Publication Data

US 2006/0092311 A1 May 4, 2006

(51) Int. Cl.
*H04N 5/225* (2006.01)
(52) U.S. Cl. .......................... 348/345; 348/340; 396/79
(58) Field of Classification Search ................. 348/335, 348/340, 345, 351, 207.99, 219.1
See application file for complete search history.

(56) References Cited

U.S. PATENT DOCUMENTS

| | | | | |
|---|---|---|---|---|
| 6,255,758 B1 * | 7/2001 | Cabuz et al. | ................. | 310/309 |
| 7,307,653 B2 * | 12/2007 | Dutta | ..................... | 348/208.7 |
| 2005/0030408 A1 * | 2/2005 | Ito et al. | ..................... | 348/340 |
| 2005/0067919 A1 * | 3/2005 | Horning | ..................... | 310/309 |

\* cited by examiner

*Primary Examiner*—David L Ometz
*Assistant Examiner*—Antoinette T Spinks
(74) *Attorney, Agent, or Firm*—Ratner Prestia

(57) ABSTRACT

A system and method for auto-focusing light. The system includes at least one focusing lens operable to direct light toward a focal point. The system further includes a sensor array disposed adjacent to the lens assembly such that the light through the lens assembly is directed to the sensor array near the focal point and a bubble array having a plurality of bubble generators. The bubble array supports the sensor array and the bubble generators are operable to maneuver the supported sensor array with respect to the focal point. Such a light focusing system is able to provide an auto-focus capability to a camera system that does not have a large amount of space available for a motor-driven auto-focus system. Furthermore, the bubble array is power efficient and does not require the amount of energy to operate as is required for a motor-driven auto-focus system.

22 Claims, 4 Drawing Sheets

AUTO-FOCUS SYSTEM USING BUBBLE TECHNOLOGY

BACKGROUND OF THE INVENTION

Auto-focus systems are used in many different kinds of camera systems including digital still cameras, digital video cameras, and any number of non-digital cameras. An auto-focus system provides the camera with a capability of automatically adjusting a focus lens so as to achieve an optimal level of sharpness in an image during an image capture procedure. For example, some cameras detect the activation of the shutter button and, before capturing an image, performs an iterative focusing procedure whereby a focus lens is moved back and forth until an optimal focus is determined by the circuitry of the auto-focus system. Then, after the focus lens is set to an optimal setting, the camera captures the image.

Typically, one of two types of auto-focus systems are used in conventional camera systems; active and passive, both of which are described in more detail below. Some cameras may have a combination of both types, depending on the complexity and price of the camera. In general, less expensive point-and-shoot cameras use an active system, while more expensive SLR (single-lens reflex) cameras with interchangeable lenses use a passive system.

An active auto-focus system typically utilizes an emitted signal from the camera in order to induce a signal echo. Based on the echo that bounces off the target object, the active system is able to determine a distance to the target object and, thereby, set the auto-focus system to a focus level corresponding to the determined distance. Such active systems typically use an infrared signal or a sound wave to determine the distance to the target object. For example, a camera having an active auto-focus system may emit an infrared signal when the shutter button is depressed and after a signal is received back from bouncing off the target, the auto-focus system of the camera sets a focus lens to a setting that is based on the returned signals. The camera may then capture the image in a conventional manner.

A passive auto-focus system, however, does not emit any signal and typically uses an analysis of image being captured to set the auto-focus system. The camera will analyze, in real-time, an image being registered at a capture point in the camera system. The capture point may be a pixel strip or pixel array that is able to convert incident light into electrical signals in order to determine the sharpness of the captured image by comparing pixels that are adjacent to each other. For example, when a camera having a passive auto-focus system is aimed at a target, an image of the target, or portion thereof, is captured at a pixel strip. The data from the pixel strip is then analyzed by a processor to determine the sharpness of adjacent portions of the captured image. The auto-focus system then maneuvers a focus lens while at the same time performing subsequent analyses of recaptured data until the captured image attains the sharpness desired.

Cameras having an auto-focus system, whether active or passive, require a lens assembly to be maneuvered in order to attain the sharpness desired. That is, the lens assembly, which focuses light through at least one focus lens onto a capture medium, such as film or a pixel array, is maneuvered toward or away from the medium such that the focal point of the focus lens changes with respect to the distance from the medium. Thus, in order to maneuver the lens assembly, a motor or group of motors is typically required. As is described below in a conventional auto-focus system, motors are bulky and power hungry.

FIG. 1 is a diagram of a conventional auto-focus system that uses a motor 122 to maneuver a lens assembly 105. The auto-focus system 100 includes a lens assembly 105 that is able to be moved by a drive mechanism 115 that is powered by a motor 122. The motor 122 is powered by a power supply 123 and controlled by a processor 132 that receives data from an auto-focus circuit 131. The nature and operation of this conventional auto-focus system 100 is described in more detail in the following paragraphs.

The lens assembly 105 typically includes a number of different lenses such as a focus lens 110, a zoom lens 111 and/or a filter lens 112. Each of these lenses are typically used to modify light, i.e., an image, that is directed through the lens assembly 105 toward a sensor array 130. The lenses of the lens assembly 105 along with a redirecting mirror 113 form the optical train in which light is directed toward the sensor array 130. As such, the lens assembly 105 may be moved with respect to the sensor array 130 and/or the redirecting mirror 113 in order to alter the manner in which the light is redirected. That is, the focal point (not shown) of the focusing lens 110 changes as the lens assembly 105 is moved such that any image that is incident upon the sensor array 130 can be maneuvered until the image is in focus.

In order to maneuver the lens assembly 105 to correctly focus an incident image on the sensor array 130, one or more relatively large motors 122 (only one shown) are required to provide the energy to move the lens assembly 105. In FIG. 1, the motor 122 is coupled to a drive mechanism 121 that translates rotational torque into lateral motion along a shaft 125. The shaft 125 is coupled to another translation point 120 that is able to maneuver the focusing lens separate from the rest of the lens assembly 105 through a screw drive mechanism 126. In other conventional systems not shown, the motor 122 and drive mechanism 121 may be coupled to the lens assembly such that the entire lens assembly is moved with respect to the sensor array 130.

The motor 122 is controlled by a processor 132 in conjunction with an auto-focus circuit 131. Typically, the sensor array 130 includes a certain number of sensors (not shown individually) that are dedicated to the auto-focus system, i.e., a focus strip 135. That is, instead of using the sensors of the focus strip 135 to collect data about an image for capture, the sensors of the focus strip 135 are used to determine whether or not the image about to be captured is in focus or not. A typical sensor array 130 is a charge-coupled device (CCD) that provides input to the auto-focus circuit 131 that is able to compute the contrast between actual picture elements. The focus strip 135 is typically a single strip of 100 or 200 pixels.

As such, the data collected from the focus strip 135 is analyzed with respect to one another to determine whether the image is focused correctly on the focus strip 135 and, subsequently, the sensors of the sensor array 130 that will be used for image capture. Various auto-focus algorithms and mathematical analyses for determining whether an image is focused are well known in the art and are not discussed in greater detail herein. Suffice it to say, data collected from the focus strip 135 through the auto-focus circuit 131, when analyzed by the processor 132 allow the processor 132 to control the motor 122 such that the lens assembly 105 is moved in one direction or the other in a repeating and iterative process until data collected from the focus-strip 135 indicates that the image is optimally focused.

Several problems exist in conventional auto-focus systems, such as the auto-focus system 100 of FIG. 1. For one, larger motors, such as motor 122, require a larger amount of space inside a camera assembly. With traditional camera systems, space is typically available for larger motors. However, as cameras are being realized in much smaller packages and assemblies, such as cell phones and the like, larger motors become more difficult to fit into the tighter space available for the camera assembly. As a result, motors to manipulate a focusing lens may not be feasible in such small places.

Additionally, these larger motors, even if used in a camera with enough space, still require a large amount of power that is undesirable in devices that are typically always powered on. That is, if power is required for a motor-driven auto-focus system in a camera that is part of a cell phone, the battery supplying the entire cell phone is drained all the faster when the motor is required to manipulate the lens assembly for focusing.

Other solutions, such the use of piezoelectric motors which may be smaller than the above-described motor 122 are also impractical because the power required to utilize the piezoelectric motors when manipulating the lens assembly is still at an undesirable high level.

SUMMARY OF THE INVENTION

An embodiment of the invention is directed to a light-focusing system having a lens assembly a sensor array and a bubble array for focusing light for a camera system. The system includes at least one focusing lens operable to direct light toward a focal point. The system further includes a sensor array disposed adjacent to the lens assembly such that the light through the lens assembly is directed to the sensor array near the focal point and a bubble array having a plurality of bubble generators. The bubble array supports the sensor array and the bubble generators are operable to maneuver the supported sensor array with respect to the focal point.

In this manner, based on feedback from a strip of sensors dedicated to an auto-focus system, the bubble array is maneuvered until the image incident on the sensor array is in optimal focus. The process may be iterative such that the bubbles are slightly adjusted each time additional feedback is received until the feedback received from iteration to iteration does not change substantially.

On one embodiment, the entire array moves up and down together as several bubbles that support the sensor array are each controlled by a central control signal. In other embodiments, each bubble is controlled by a dedicated control signal.

Such a light focusing system is able to provide an auto-focus capability to a camera system that does not have a large amount of space available for a motor-driven auto-focus system. Furthermore, the bubble array is power efficient and does not require the amount of energy to operate as is required for a motor-driven auto-focus system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is presented to enable a person skilled in the art to make and use the invention. The general principles described herein may be applied to embodiments and applications other than those detailed above without departing from the spirit and scope of the present invention. The present invention is not intended to be limited to the embodiments shown, but is to be accorded the widest scope consistent with the principles and features disclosed or suggested herein.

Figure 1:
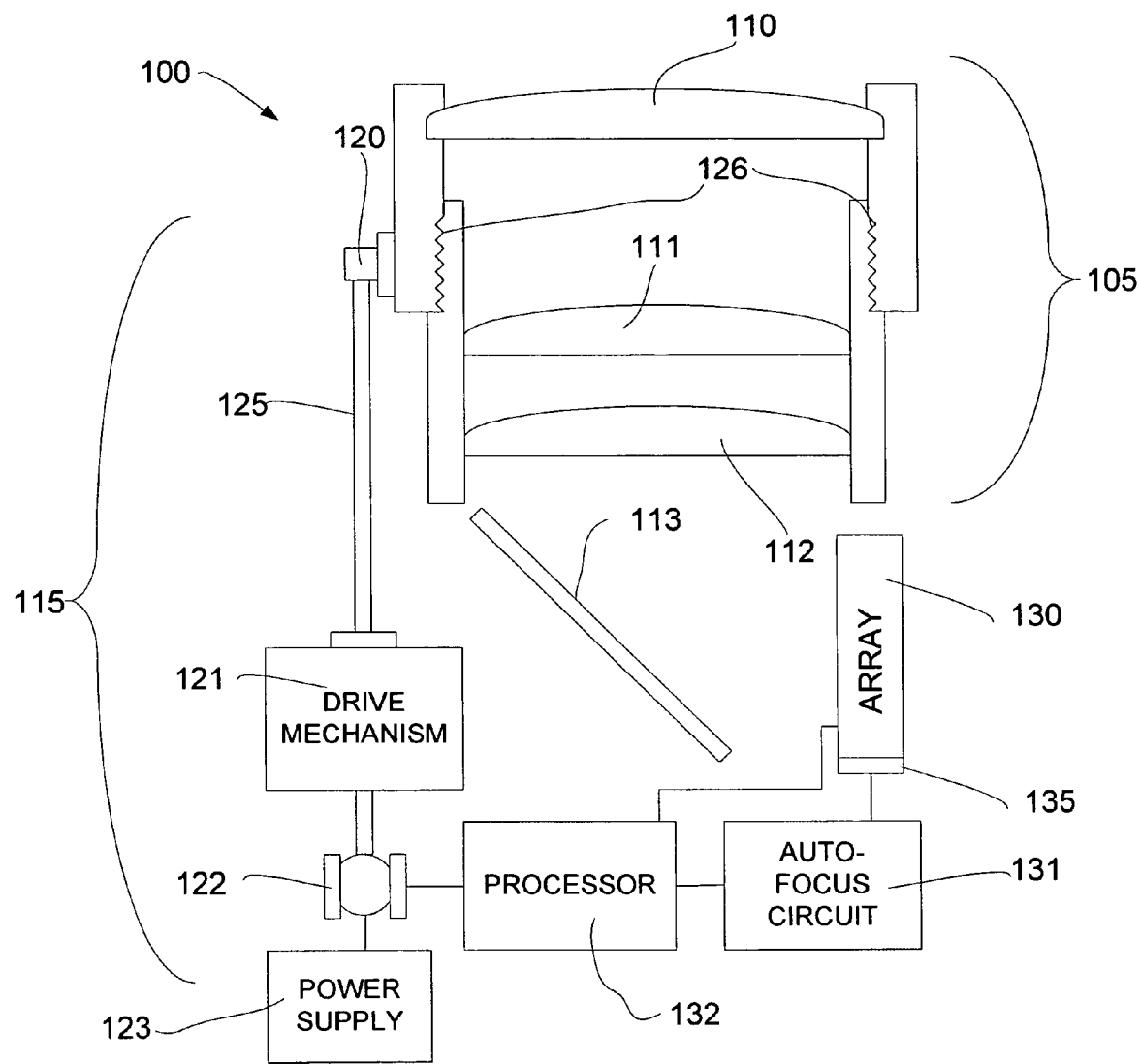
FIG. 1 is a diagram of a conventional auto-focus system that uses a motor to maneuver a lens assembly.
Figure 2:
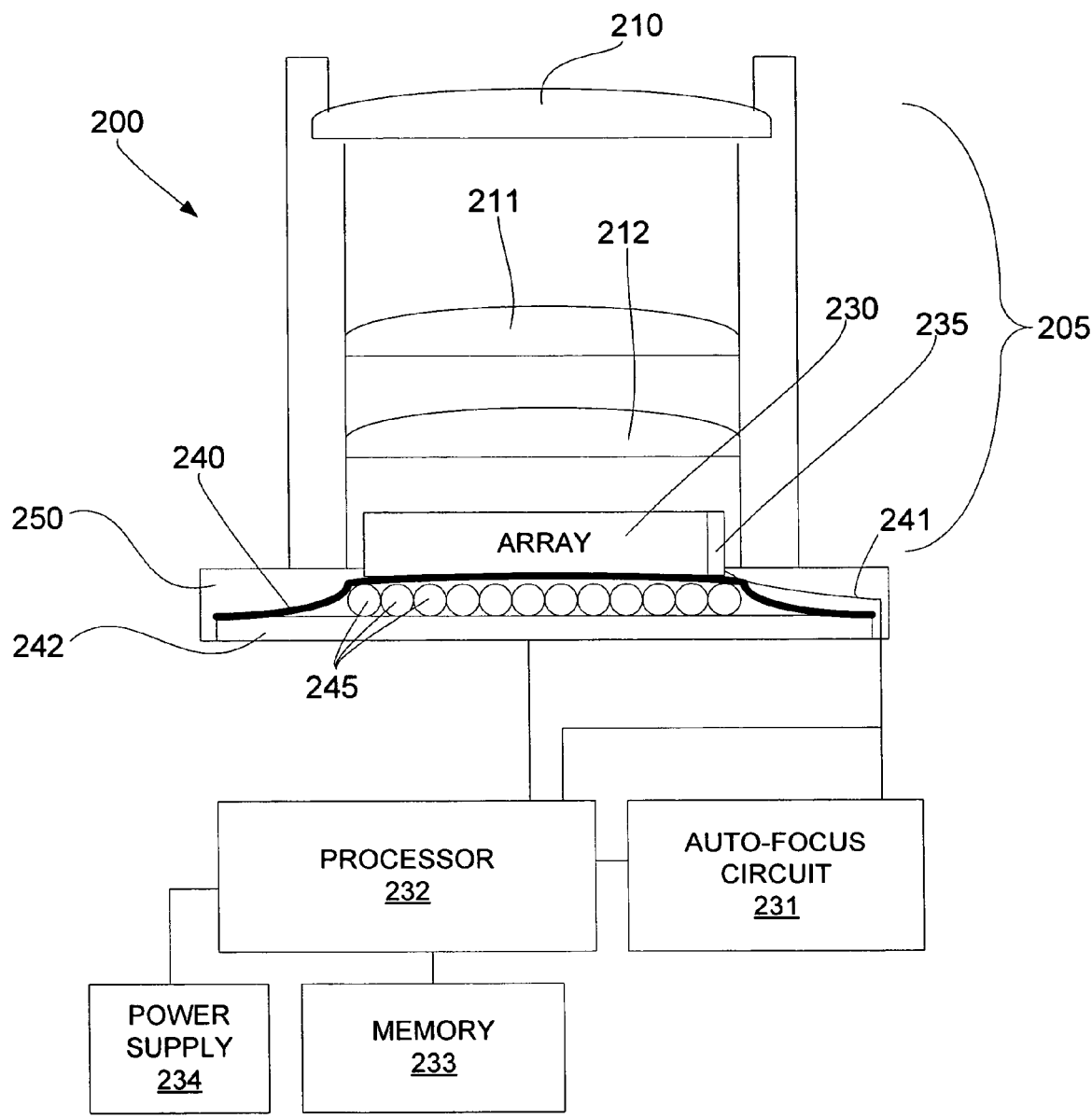
FIG. 2 is a diagram of a an auto-focus system having a sensor array that is able to be positioned by a plurality of inflatable bubbles disposed on a bubble array according to an embodiment of the invention.

FIG. 2 is a diagram of a an auto-focus system 200 having a sensor array 230 that is able to be positioned by a plurality of inflatable bubbles 245 disposed on a bubble array 242 according to an embodiment of the invention. The sensor array 230 includes a focus strip 235 of sensors that are dedicated to capturing image data to be used for an analysis of the sharpness of the image. The focus strip 235 is electrically coupled to an auto-focus circuit 231 and collectively, these two components are able to generate an indication of the sharpness of the incident image that may be detected by the focus-strip 235. In this manner, a processor 232 is able to use the sharpness indication generated by the auto-focus circuit 231 to adjust the inflation level of the bubbles 245 in the bubble array 242 such that the entire sensor array 230 is raised or lowered accordingly. As a result, the raising and lowering allows the incident light to attain better sharpness, i.e., focus, when captured by the sensors of the sensor array 230 that are dedicated for image capture. Both the bubble array 242 and the auto-focus circuit 231 are described in further detail below.

The bubble array 242 is electrically coupled to the processor 232 and is able to be controlled by the processor 232. When the auto-focus circuit 231 determines that an adjustment is required, the auto-focus circuit 231 communicates a signal to the processor 232. The processor 232, in turn, generates a signal in response to the auto-focus circuit 231 determination that causes the one or more bubbles 245 in the bubble array 242 to inflate to an appropriate level such that an image incident on the sensor array 230 comes into focus.

For example, when light (i.e., light from an image that is to be captured) is incident on the sensor array 230 through the lens assembly 205, the auto-focus system 200 of the present invention analyzes the incident light for sharpness to determine the best position for the sensor array 230 to accurately capture the incident light. As such, light that is incident on the focus strip 235 is captured by sensors thereon and signals representing the captured light are transmitted to the auto-focus circuit 231.

The auto-focus circuit 231 then analyzes the captured data to determine a sharpness factor or focus factor. The focus factor is an indication of the intensity differences between adjacent pixels. When an image is out of focus, the intensity levels between adjacent pixels does not change much from pixel to pixel. Hence, the reason that an image will appear blurred. However, in a focused image, the intensities between pixels changes more rapidly as the image appears sharp to the human eye. Thus, the focus factor is a numerical quantization of the differential intensities from pixel to pixel.

Once the focus factor is determined, it is transmitted to the processor 232. The processor 232 receives the focus factor and determines how much the sensor array 230 should be moved in order to adjust the focus of the image being captured. Thus, an adjustment signal is generated by the processor 232, which is then transmitted to the bubble array 242. The adjustment signal may be digital or analog and may be a multiplexed signal having several adjustment signals that may correspond to several bubbles 245 of the bubble array 242. The bubbles 245 of the bubble array 242 are then inflated to a level corresponding to the adjustment signal received.

Typically, when a method for auto-focusing begins, the bubbles 245 of the bubble array 242 are at a zero-inflation state. Inflating the bubbles 245 from a zero-inflation state to a fully-inflated state provides a movable distance to the sensor array 230 of about 100 um. Thus, when completely deflated, the sensor array 230 is at the beginning of the 100 um range and typically focused at infinity, which for the purposes of image capture in a camera, corresponds to objects beyond about 100 meters from the camera. If target objects are within 100 meters of the camera at image capture, the auto-focus system 200 adjusts the sensor array 230 by inflating the bubbles 245 of the bubble array 242 in an attempt to attain optimal focus. The bubbles 245 may be inflated to a corresponding discrete level, i.e., a level that corresponds to one of ten, for example, discrete distance determinations between 0 meters and 100 meters. Alternatively may be inflated to a level that linearly corresponds to the determined distance, i.e., a distance of 50 meters (half of the 0-100 meter range) would result in the bubbles 245 being half inflated (50 um vertical movement).

The bubble array 242 of FIG. 2 comprises a plurality of bubbles 245 arranged on the bubble array 242 substrate and each individual bubble 245 is operable to be controlled by the processor 232. The bubble array 242 is described in greater detail with respect to FIG. 3.

The bubbles 245 of the bubble array 242 are typically covered by an elastic membrane 240 that prevents the sensor array 230 or anything else from coming into direct contact with the sensitive bubbles 245. The elastic membrane 240 is form fit to the contour of the upper plane of the bubble array 242. That is, the membrane 240 does not form fit to the spherical contours of each individual bubble 245, but rather, the membrane engages each top-most portion of the bubbles 245 as they inflate such that the membrane as a whole provides a semi-flat surface for the sensor array 230 to be affixed to. Thus, as the bubbles 245 inflate, the sensor array 230 supported by the bubbles 245 maintains a relatively flat position as well because the membrane does not completely fall to the contours of the spherical bubbles 245. Likewise, as the bubbles 245 deflate, the sensor array 230 may be lowered to an original position, i.e., focused at infinity.

Using bubble technology to raise and lower the sensor array 230 during a focusing process is a faster method of focusing an incident image when compared to the slower nature of motor movement. Furthermore, the electrical power required to heat the individual bubbles for inflation is far less than the power required for actuating one or more motors. Thus, the auto-focusing system 200 is more power efficient and faster than conventional auto-focus systems.

Because the sensor array 230 is able to move up and down as the bubbles 245 of the bubble array 242 are inflated and deflated, any I/O points for the sensors of the sensor array 230 are typically connected to a flexible I/O link, such as I/O link 241. As shown in. FIG. 2, the I/O link is coupled between the focus strip 235 and the auto-focus circuit 231 although this I/O link represents a connection to all sensors of the sensor array 230 including those dedicated as the focus strip 235. The I/O link is also connected to the sensor array 230 (although not shown in detail) such that signals generated at the sensors of the sensor array 230 may be transmitted to the processor 232. Typically, the I/O link 241 will be a single flexible serial cable such that all signals from the sensor array 230 are transmitted therein. Alternatively, the I/O link 241 may be a pair of serial links such that signals from the focus strip 235 are transmitted to the auto-focus circuit 231 and signals from the sensors of the sensor array 230 dedicated for image capture are transmitted to the processor 232. However, any I/O distribution is possible and the auto-focus circuit 231 may even be part of the processor 232 as a software implementation within the processor 232.

Additionally, all data collected by the processor 232 from the focus strip 235 and the sensor array 230 may be stored in a memory 233 that is coupled to the processor 232. The memory 233 may archive this data for later analysis, such as a focus algorithm that surveys focus data over a period of time before the processor generates an adjustment signal. Further, the particular discrete focus settings may be stored such that when the focus data is analyzed to meet a specific criteria, i.e., a great deal of light in one section of the focus strip 235 indicating the possible position of the sun behind the target objects, then the processor 232 positions the sensor array 230 to a predetermined position. In another example, the algorithm may be biased for foreground or background image focus. As such, the presence of a small object in the foreground may take precedence over many objects in the background when determining where to position the sensor array 230. Other scenarios for automatic discrete focus settings are contemplated but not discussed in greater detail herein.

The lens assembly is FIG. 2 is shown as affixed to a housing 250 of the sensor array 230 and bubble array 242. The lens assembly 205 is also shown having a focus lens 210, a filtering lens 211 and a zoom lens 212. Other combinations of lenses in the lens assembly 205 are possible, but not discussed herein. Furthermore, the lens assembly 205 need not be affixed to the housing 250, but rather may be designed to include additional movable parts such as a zoom feature that allows the zoom lens 211 to be adjusted. These additional lens assembly 205 features are contemplated but not discussed in greater detail herein.

A typical focus strip 235 is a charge-coupled device (CCD) that provides input to auto-focus circuit 231 that may compute the contrast of the actual picture elements of focus strip 235. The CCD is typically a single strip of 100 or 200 pixels. Light from the scene hits this strip and the auto-focus circuit 231 analyzes the values from each pixel. Typically, the focus strip 235 is vertical or horizontal with respect to the image being captured. In one embodiment, the auto-focus system 200 may incorporate two focus strips 235, one vertical and one horizontal, to better analyze the incident light for focusing.

Figure 3:
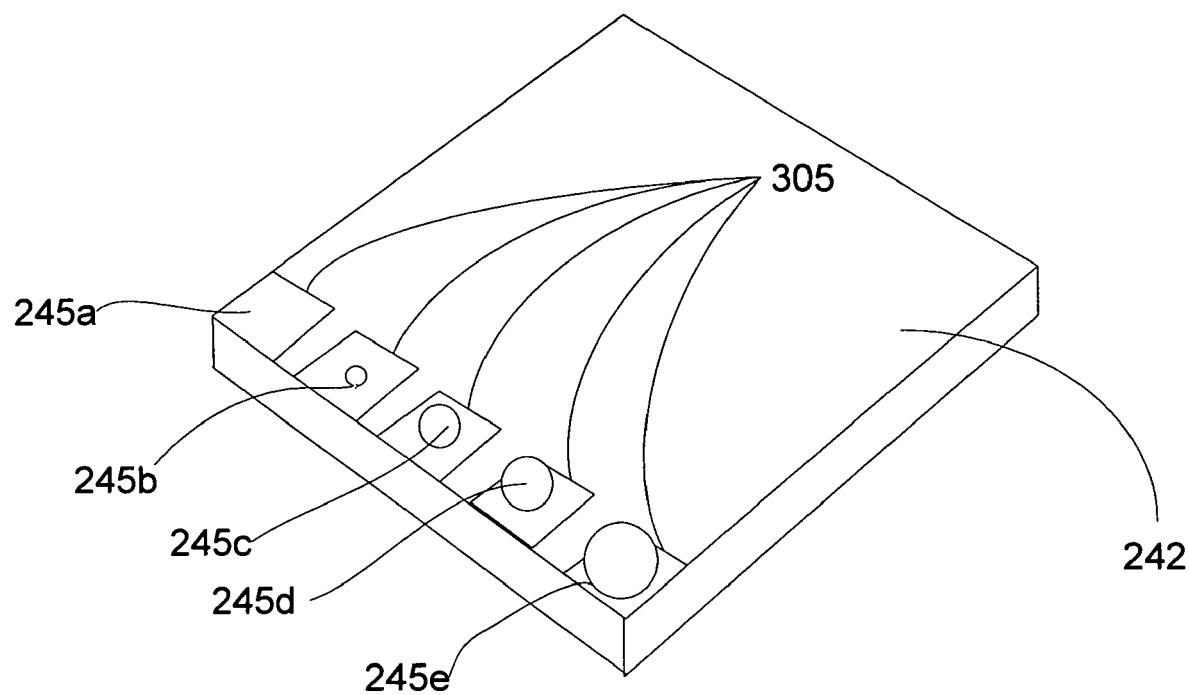
FIG. 3 is an isometric view of a bubble array having a plurality of bubbles disposed thereon according to an embodiment of the invention.

FIG. 3 is an isometric view of a bubble array 242 having a plurality of bubbles 245a-e disposed thereon according to an embodiment of the invention. The bubble array 242 typically embodies a surface area equivalent to the sensor array 230 (not shown in FIG. 3) that is supported by the bubble array 242. However, the entire surface area (shown as the top side of the bubble array 242) need not necessarily consists entirely of bubbles 245. For example, as shown in FIG. 3, only the outside edges of the bubble array 242 may have bubbles 245 (although only one side is shown having bubbles 245 in FIG. 3). Other bubble 245 patterns may include a checkerboard of bubbles 245, only bubbles 245 on the corners, or alternating rows (i.e., one row having bubbles 245 and an adjacent equivalent area not having bubbles 245 and so on).

Each bubble 245 in the bubble array 242 corresponds to an associated bubble generator 305. Each bubble generator 305 includes a resistive element (not shown in detail) that may be used to heat the bubble associated with each bubble generator 305. Each bubble 245 in the array comprises an elastic membrane filled with a gas or liquid well suited to be heated, such as helium, for example. As heat is added to a bubble generator 305, the corresponding bubble 245 begins to inflate as the liquid or gas enclosed by the membrane expands. Typically, the gas or liquid is a safe and reliable substance able to have a volume that is highly controllable.

For example, helium in an enclosed volume, such as within the membrane of a bubble 245, will necessarily react according to the ideal gas law, $PV=nRT$, where P=pressure, V=volume, n=number of moles, R=universal gas constant, and T=temperature. Since n and R are constants and it can be assumed that the pressure will not change dramatically (i.e., atmospheric pressure as the elastic membrane only adds a negligible amount of pressure to the enclosed space, hence the reason that the membrane can inflate), the volume will increase as the temperature increases, proportionally. As such, an electric signal through the generator 305 resistor may be tailored to a level that applies a specific amount of heat to the bubble 245 so that the temperature rises, which in turn inflates the bubble 245 to a proportionate volume.

As can be seen in FIG. 3, a first bubble 245a is not inflated and may be at a room temperature such that the gas enclosed in the membrane of the bubble generator 305 remains deflated. That is, the gas still occupies a finite volume, but the volume is entirely below a top plane of the bubble generator 305 such that the bubble 245a appears completely deflated. This level may correspond to an adjustment signal from the processor 232 having a discrete level of zero. The next bubble 245b is shown inflated to a small degree. This may correspond to the next discrete level, i.e., an adjustment signal from the processor 232 is received that corresponds to a first discrete level. The next bubbles 245c and 245d again show a slightly larger volumes that may corresponds to yet more discrete adjustment signal levels. Finally, the largest bubble 245e may be the larger discrete level wherein the maximum adjustment signal is received at each resistor of each bubble generator 305 such that the volume is maximized with respect to the highest attainable, safe temperature. As such, the processor 232 may generate any number of discrete adjustment signals so as to heat each volume of enclosed gas in each bubble 245 in each bubble generator 305. Thus, each bubble 245 inflates to a specific volume and the supported sensor array 230 may be raised to a particular focal point with respect to the focus lens (210 of FIG. 2).

As described above, the differing inflation levels correspond to discrete digital signal levels of the adjustment signal from the processor 232. Alternatively, the inflation levels may correspond to an analog signal that is transmitted to each bubble generator 305. The processor generates an adjustment signal as a digital value, but the digital value may be passed to a digital-to-analog converter (not shown) that converts the digital signal to an analog signal. The analog signal is then, in turn, passed to the resistor of each of bubble generator 305. In this manner, the bubbles generators 305 need not have a resistive element capable of receiving a digital signal such that the digital signal must be interpreted before generating heat for the inflation of the corresponding bubble 245.

In any case, a number of different discrete or analog focus levels may be implemented based on the adjustment signal that is a function of the feedback received from the sensors at the focus strip 235. The figures below illustrate various contemplated focus levels.

Figure 4:
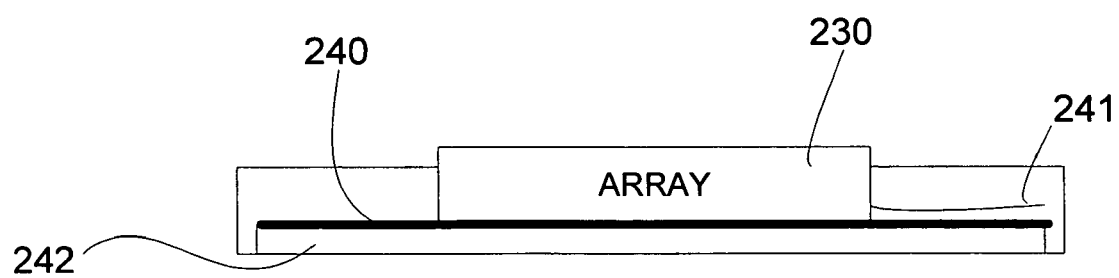
FIG. 4 is a diagram of the sensor array and bubble array of FIG. 2 in zero-inflation state according to an embodiment of the invention.

FIG. 4 is a diagram of the sensor array 230 and bubble array 242 of FIG. 2 in zero-inflation state according to an embodiment of the invention. When the auto-focus system 200 is first acquiring data from sensors at the focus strip 235, the initial starting point is typically a zero-inflation state or focus-at-infinity state. That is, the sensor array 230 is at its lowest point with respect to the focus lens 211 (not shown in FIG. 4) because the bubbles 245 (unable to be seen in FIG. 4) are at a completely deflated level. The completely deflated level corresponds to the lowest value adjustment signal from the processor 232, and may even be a zero signal or no signal.

The zero-inflation state is a convenient starting point for analyzing the sharpness of an incident image since all adjustments based on the feedback can be incrementally increased until the desired sharpness is achieved. Thus, a first adjustment level can be first applied such that the bubbles 245 raise the sensor array 230 a small amount. Then a second analysis, i.e., a second collection of data from the focus strip 235, may determine that an additional adjustment is necessary, so the processor 232 increases the value of the adjustment signal which causes the sensor array 230 to be raised by the bubble array 242 even more. This iterative process repeats until the feedback data from the sensors at the focus strip 235 indicate a desired sharpness of the incident image.

Figure 5:
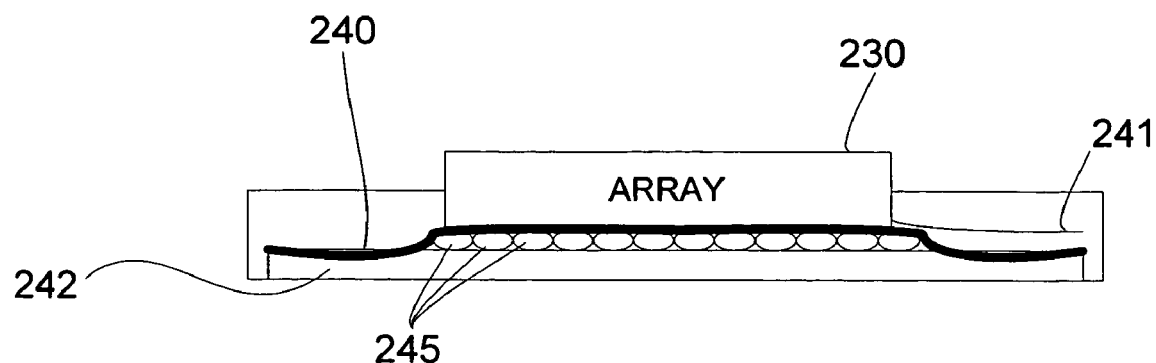
FIG. 5 is a diagram of the sensor array and bubble array of FIG. 2 in a mid-level inflation state according to an embodiment of the invention.

FIG. 5 is a diagram of the sensor array 230 and bubble array 242 of FIG. 2 in a mid-level inflation state according to an embodiment of the invention. As such, the adjustment signal being transmitted to each resistor of each bubble generator 305 (not shown in detail) is generating a finite amount of heat such that each bubble 245 is inflated to a mid-level volume. Therefore, the sensor array 230 is raised to a mid-level focus level. FIG. 5 is an example of the possible end-result of the above-described iterative process for determining the optimal sharpness of any incident image at the sensor array 230.

As will be shown below, the bubbles 245 of the bubble array 242 need not all be inflated uniformly. For example, bubbles 245 may inflated to increasing levels across a linear path on the bubble array 242.

Figure 6:
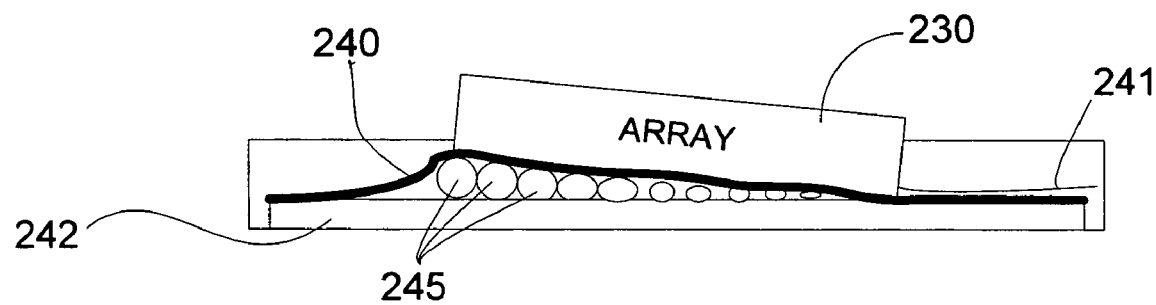
FIG. 6 is a diagram of the sensor array and bubble array of FIG. 2 that illustrates an alternative method for reaching an optimal focus state according to an embodiment of the invention.

FIG. 6 is a diagram of the sensor array 230 and bubble array 242 of FIG. 2 that illustrates an alternative method for reaching an optimal focus state according to an embodiment of the invention. As can be seen bubbles 245 on the left-hand side of the bubble array 242 are inflated more than the bubbles 245 on the right-hand side of the bubble array 242. This non-uniform inflation of bubbles 245 results in a tilt of the sensor array 230. A sensor array 230 tilt may be useful to compensate for a slightly misaligned seating of the sensor array 230 in the first place. That is, the sensor array 230 may have been seated during a manufacturing process such that one corner is seated higher than the rest. As a result, without maneuvering the sensor array 230 by tailoring each individual bubble size to compensate, portions of every image captured would be out of focus, i.e., the portion of the image corresponding to the anomalous corner of the sensor array 230. By adjusting each bubble individually, problems from anomalous focus areas of a captured image may be alleviated.

Additionally, the focus strip 235 may collect data about the image to be captured that, when analyzed, reveals two distinct object depths across the entire image plane. For example, the image to be captured may include a person on the left-hand side standing at a cliff overlooking the ocean on the right-hand side. To correctly focus on the person, the left-side analysis would need to take precedence, but to correctly focus on the ocean, the right-hand side would need to take precedence. Thus, if the bubble array 242 were to receive a pattern of adjustment signals from the processor such that the bubbles 245 of the bubble array 242 position the sensor array similar to FIG. 6, then the two separate objects may both be more in focus that without tilting the sensor array 230. Additionally, two focus strips 235 in an auto-focus system 200 may allow focusing based on three-dimensions to be realized more effectively. That is, so-called 3D functioning is better accomplished using two focus strips 235 in conjunction with a adjustable bubble array 242.

We claim:

1. A light-focusing system, comprising:
a fixed lens assembly including at least one focusing lens operable to direct light toward a focal point;
a sensor array disposed adjacent to the fixed lens assembly such that the light through the fixed lens assembly is directed to the sensor array near the focal point; and
a bubble array coupled to a plurality of bubble generators operable to maneuver at least a central portion of the supported sensor array toward the focal point to improve sharpness of an image;
wherein an entirety of the sensor array is configured to be maneuvered across a linear path towards the focal point.

2. The light-focusing system of claim 1 wherein the sensor array further comprises a complimentary metal-oxide substrate having a plurality of active pixel sensors disposed in rows and columns thereon.

3. The light-focusing system of claim 1 wherein the sensor array further comprises a charge-coupled device having a plurality of charge-sensing elements disposed in rows and columns thereon.

4. The light-focusing system of claim 1 wherein the fixed lens assembly further comprises a zoom lens operable to adjust the focal point of the fixed lens assembly.

5. The light-focusing system of claim 1 wherein each of the plurality of bubble generators comprises a resistor disposed below an elastic membrane such that the elastic membrane is inflated to a level proportional to a signal propagated through the resistor.

6. The light-focusing system of claim 5 wherein the signal is an electric signal.

7. The light-focusing system of claim 5 wherein the signal is a thermal signal.

8. The light-focusing system of claim 5, further comprising a processor coupled to the bubble generator and operable to control each of the plurality of bubble generators by generating each of the signals that propagate through each of the resistors in each bubble generator.

9. The light-focusing system of claim 8, further comprising an auto-focus circuit operable to collect data from the sensor array, the auto-focus circuit coupled to the processor.

10. The light-focusing system of claim 9 wherein the processor is further operable to control the maneuvering of the sensor array supported by the bubble array based upon an analysis of the data collected by the auto-focus circuit.

11. The light-focusing system of claim 1 wherein the maneuvering of sensor array is based on feedback data collected from and iterative data collection procedure.

12. A method for focusing light onto a sensor array, the method comprising:
focusing light through a fixed lens assembly toward a plurality of sensors in a sensor array, the sensor array supported by an array of bubbles, each bubble having an elastic membrane operable to be inflated based upon a signal propagating through a respective bubble generator resistor;
wherein an entirety of the sensor array is configured to be maneuvered across a linear path towards the focal point;
collecting data about the focused light at the sensor array;
generating an adjustment signal based on the analysis of the collected data; and
adjusting the position of the sensor array by inflating at least one bubble, the at least one bubble inflated to a level corresponding to the adjustment signal to maneuver at least a central portion of the supported sensor array toward a focal point to improve sharpness of an image.

13. The method of claim 12 wherein the collecting further comprises collecting data at a first vertical strip of focus sensors and collecting data at a second strip of horizontal focus sensors.

14. The method of claim 12 wherein the adjusting further comprises adjusting the position of the sensor array to be tilted with respect to an image plane of the focused light.

15. The method of claim 12, further comprising:
collecting a second set of data about the focused light at the sensor array;
generating a second adjustment signal based on an second analysis of the second set of collected data; and
adjusting the position of the sensor array by inflating or deflating at least one bubble, the at least one bubble inflated or deflated to a level corresponding to the adjustment signal.

16. The method of claim 12, further comprising storing the collected data in a memory.

17. The method of claim 12 wherein the analyzing further comprises determines a sharpness factor by comparing the incident light captured at a first sensor to the incident light captured at a second sensor.

18. The method of claim 12, further comprising storing at least a portion of the data collected in a memory.

19. A camera, comprising:
an auto-focus system including:
a fixed lens assembly including at least one focusing lens operable to direct light toward a focal point;
a sensor array disposed adjacent to the fixed lens assembly such that the light through the fixed lens assembly is directed to the sensor array near the focal point;
a bubble array coupled to a plurality of bubble generators operable to maneuver at least a central portion of the supported sensor array toward the focal point to improve sharpness of an image; and
a processor operable to control the auto-focus system by inflating at least one bubble;
wherein an entirety of the sensor array is configured to be maneuvered across a linear path towards the focal point.

20. The camera of claim 19 wherein each bubble generator further comprises a resistor disposed below an elastic membrane such that the elastic membrane is inflated proportional to a signal propagated through the resistor.

21. The camera of claim 19, further comprising an analysis circuit operable to analyze the focused light to determine a focus factor such that at least one bubble is inflated to a level corresponding to the determined focus factor.

22. The camera of claim 19 wherein the analysis circuit is operable to iteratively determine an optimal level of inflation based upon a repetitive analysis of the directed light.

* * * * *